United States Patent [19]
Wadsworth et al.

[11] Patent Number: 6,135,417
[45] Date of Patent: Oct. 24, 2000

[54] VALVE SPINDLE ACTUATOR

[75] Inventors: Martin J. Wadsworth, Alderbrook; Stephen L. Foster, Blackburn, both of United Kingdom

[73] Assignee: EJA Engineering Ltd., Wigan, United Kingdom

[21] Appl. No.: 09/297,704

[22] PCT Filed: Aug. 28, 1998

[86] PCT No.: PCT/GB98/02597

§ 371 Date: Jul. 16, 1999

§ 102(e) Date: Jul. 16, 1999

[87] PCT Pub. No.: WO99/13254

PCT Pub. Date: Mar. 18, 1999

[51] Int. Cl.[7] .................................................. F16K 31/00
[52] U.S. Cl. ........................................... 251/291; 251/292
[58] Field of Search ..................................... 251/291, 292

[56] References Cited

U.S. PATENT DOCUMENTS

| | | | |
|---|---|---|---|
| 3,532,109 | 10/1970 | Smith | 251/291 |
| 3,768,775 | 10/1973 | Archer | 251/230 |
| 4,577,830 | 3/1986 | Winegeart | 251/84 |
| 4,633,897 | 1/1987 | Effenberger | 137/315 |
| 4,719,939 | 1/1988 | Killian | 137/315 |
| 4,817,663 | 4/1989 | McAndrew | 137/385 |
| 4,887,634 | 12/1989 | Killian | 137/315 |
| 5,240,030 | 8/1993 | Wang | 137/269 |
| 5,257,771 | 11/1993 | Portis et al. | 251/293 |
| 5,409,037 | 4/1995 | Wheeler et al. | 137/551 |
| 5,520,210 | 5/1996 | Barton | 137/296 |
| 5,531,243 | 7/1996 | Broussard | 137/315 |
| 5,564,461 | 10/1996 | Raymond, Jr. et al. | 137/315 |
| 5,609,324 | 3/1997 | Pinkney | 251/292 |
| 5,620,022 | 4/1997 | Manoogian | 137/383 |
| 5,924,442 | 7/1999 | Vorosmarti | 251/292 |
| 5,967,171 | 10/1999 | Dwyer, Jr. | 137/78.1 |
| 5,975,118 | 11/1999 | Ulicny et al. | 137/338 |
| 5,988,205 | 11/1999 | Eggleston | 137/315 |

*Primary Examiner*—A. Michael Chambers
*Assistant Examiner*—Thomas L. McShane
*Attorney, Agent, or Firm*—Himanshu S. Amin; John J. Horn; William R. Walbrun

[57] ABSTRACT

An actuator for controlling the rotation of a valve spindle relative to a valve body (5). The actuator is in the form of an actuator body which receives a rotatable hub (6). The actuator body (3) is secured to the valve body by for example a mounting plate (7) which is bolted to the valve body or straps which are clamped to pipework connected to the valve body. The hub is retained in a predetermined position adjacent the valve body by the actuator body such that it may rotate with the valve spindle. Jaws (15) are mounted on the hub which may be clamped into engagement with the valve spindle so that torque applied to the hub by for example an actuator bar (12) is transmitted to the valve spindle.

16 Claims, 8 Drawing Sheets

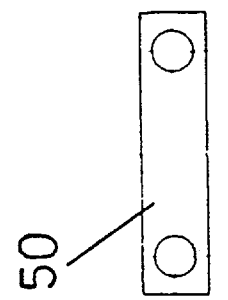
FIG.23
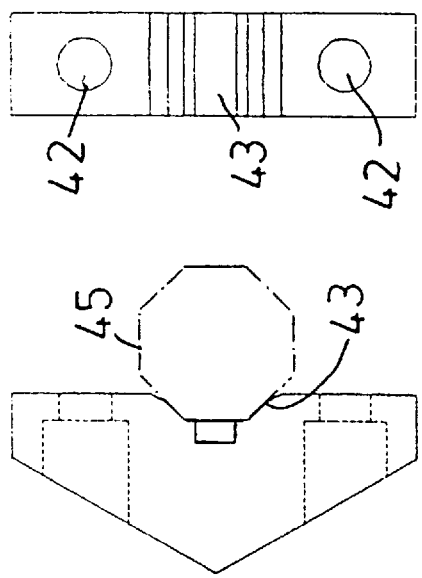
FIG.25
FIG.24
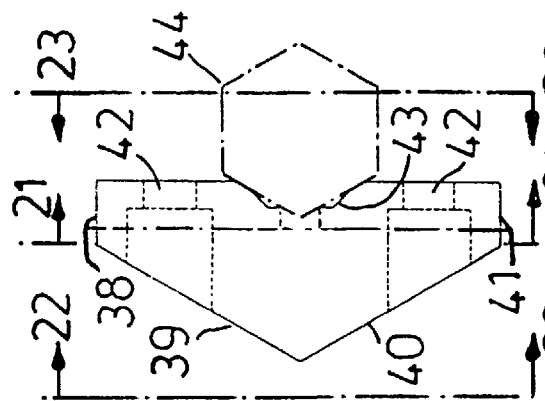
FIG.22
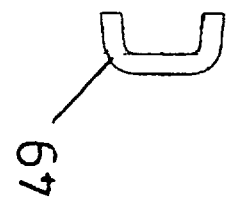
FIG.27
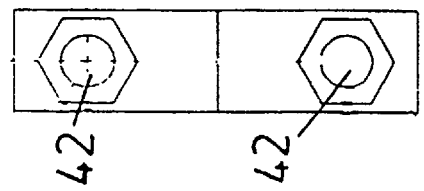
FIG.21
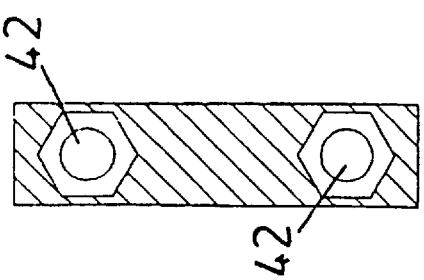
FIG.26
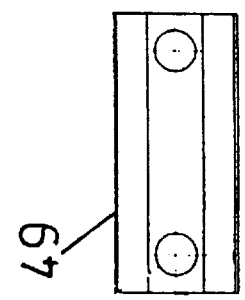
FIG.28

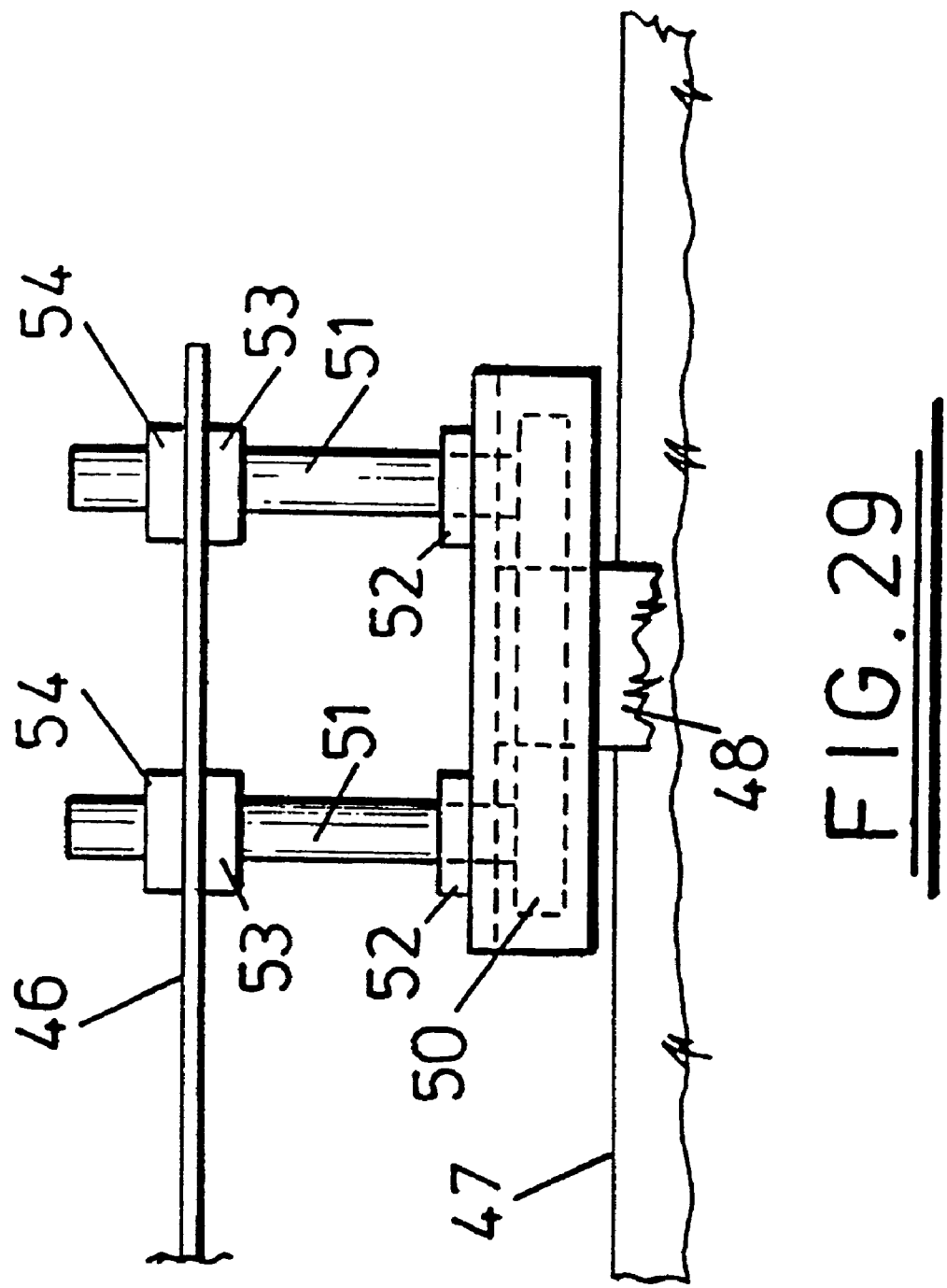

VALVE SPINDLE ACTUATOR

The present invention relates to an actuator for controlling the rotation of a valve spindle relative to a valve body.

Manually operated valves are actuated by applying torque to a valve spindle using a hand wheel, lever or other actuating device secured to the valve spindle. With only rare exceptions valve spindles define flat surfaces to provide a non-circular cross-section. The associated lever or hand wheel is provided with a mating cross-section and is retained on the spindle by a lock-nut or the like. The mating flat surfaces defined by the spindle and the hand wheel or lever ensure that one cannot rotate without the other.

It is often necessary to retro-fit a valve with a replacement actuating member. For example, it is often the case that a decision is taken to incorporate valve locks on an existing installation. In the petrochemical industry it is often the case that flow through a complex network of pipes is controlled by a series of valves which should only be actuated in a predetermined order. In such circumstances it is known to provide lockable valves which can only be actuated after insertion of an appropriate key. For example in an installation where there are three valves A, B and C which must be actuated in that order, actuation of valve A will be prevented until a first key has been inserted. a second key normally retained by valve A can be removed from valve A only after the valve has been actuated, valve B can only be actuated after the second key has been inserted into it, thereby releasing a third key, and valve C can only be actuated after insertion of the third key. With such an interlocked series of valves complex installations can be controlled in a substantially foolproof manner.

It is clearly desirable to be able to retro-fit lockable valve actuators to existing valves. This requires a mechanical linkage between the existing valve spindle and the lock mechanism. The conventional approach to providing the necessary mechanical linkage is to remove the original hand wheel or lever from the installed valve, and to replace the original hand wheel or lever with a lockable mechanism which comprises two basic components, that is an actuator body which must be secured in some way to the body of the existing valve and a hub which must be secured in some way to the spindle of the existing valve. Given the wide variety of spindle cross-sections that are known, and the variety of valve bodies which are known, these two interconnection problems make it very difficult to supply standard components which can be fitted to a wide range of valve body and spindle configurations. Accordingly before an existing valve can be reliably modified to incorporate a valve locking mechanism, it is necessary to accurately identify the exact characteristics of the valve spindle cross-section and the valve body. This is a time consuming and uncertain process which adds significantly to the overall cost of a retro-fitted valve interlock system.

In an attempt to overcome the problem of achieving the required interconnection between a valve lock mechanism and the spindle of a previously installed valve. a system has recently been introduced which claims to make it possible to mount a valve interlock on an existing valve using the existing valve hand wheel or lever. In the arrangement proposed for a lever operated valve, a clamping system engages the existing lever and is coupled by a series of interconnected links to a locking mechanism which is clamped to pipework connected to the valve body. In a hand wheel operated arrangement, a locking mechanism is clamped around the valve body beneath the existing hand wheel and connected to the hand wheel by an appropriate clamp. Thus in this known solution to the problem it has been assumed that there is no acceptable way to make reliable connections to a valve spindle of unknown cross-section, and the need for making such a reliable interconnection has been avoided by making interconnections to the original valve lever or hand wheel. Unfortunately, the overall effect of this solution to the problem is cumbersome with many components of the interlock mechanism exposed to damage and tampering.

It is an object of the present invention to obviate or mitigate the problems outlined above.

According to the present invention, there is provided an actuator for controlling the rotation of a valve spindle relative to a valve body, the actuator comprising an actuator body which in use is secured to the valve body, a hub retained by the actuator body so as to be rotatable relative to the actuator body about the rotation axis of the spindle, jaws movably mounted on the hub and displaceable into engagement with the spindle, and means for clamping the jaws in engagement with the spindle such that torque applied to the hub is transmitted to the spindle.

The clamping jaws make it possible to reliably connect the hub to the valve spindle of substantially any existing valve, given that existing valves have stems which define flat surfaces against which the jaws can be clamped.

The jaws may be slidably mounted on the hub and interconnected by a pair of bolts extending perpendicular to and on opposite sides of the rotation axis. The bolts can then be tightened to clamp the jaws against flat surfaces of the spindles. The jaws may be retained on one end of the hub by further bolts extending parallel to the rotation axis of the spindle. Tightening of the further bolts further secures the jaws against displacement relative to the spindle by clamping the jaws to the hub.

An actuating bar may be secured to portions of the hub projecting from the actuator body, and a lock mechanism may be engaged between the actuator body and the hub to prevent rotation of the hub relative to the actuator body. The lock mechanism may be carried by the actuator body and support a displaceable latch which projects into a slot formed in the hub. A recess may be formed in a side wall of the slot, the latch being displaceable into the recess when the hub is in a predetermined position relative to the actuator body.

The actuator body may be secured to a mounting plate which in turn is secured to the valve body. The mounting plate may be bolted to the valve body by bolts which are covered by the actuator body after it in turn is bolted to the mounting plate. A cover plate may in turn be secured to the actuator body so as to obstruct access to the bolts securing it to the mounting plate. The cover plate may be secured by, for example, adhesive and be arranged such that it can only be removed by causing it visually apparent damage. Alternatively the actuator body may be secured to the valve body by straps which extend from the actuator body and are clamped to the pipework connected to the valve body.

The jaws may be slidably received in a socket defined by the hub and interconnected by a pair of bolts extending perpendicular to and on opposite sides of the rotation axis, whereby the jaws may be clamped onto the spindle by tightening the bolts, the jaws being shaped such that when clamped onto the spindle and engaged by the huh socket torque applied to the hub is transmitted to the spindle.

The present invention also provides an actuator for controlling the rotation of a valve spindle relative to a valve body, the actuator comprising an actuator body which in use is secured to the valve body, and a hub mechanically coupled to the spindle and retained by the actuator body so as to be rotatable with the spindle such that torque applied to the hub is transmitted to the spindle, wherein straps are mounted on the actuator body in orientations such that these straps may be clamped onto pipework connected to the valve body to secure the actuator body to the valve body.

The straps may be formed from plates of deformable material and pivotally mounted on the actuator body. Clamps may be provided for connecting straps to the pipework, the clamps comprising a plate which may be clamped to the pipework by a hoop clamp, bolts supported by the plate, and means for securing the straps to the bolts.

Embodiments of the present invention will now be described, by way of example, with reference to the accompanying drawings. in which;

FIG. 5 is a plan view of an actuator body which is a component of the assembly of FIGS. 1 and 2;

FIG. 6 is a view from below of the actuator body of FIG. 5,

FIG. 7 is a view of FIG. 6 on line 7—7,

FIG. 8 is a section on line 8—8 of FIG. 6, and

FIG. 9 is a view on line 9—9 of FIG. 6;

Figure 1:
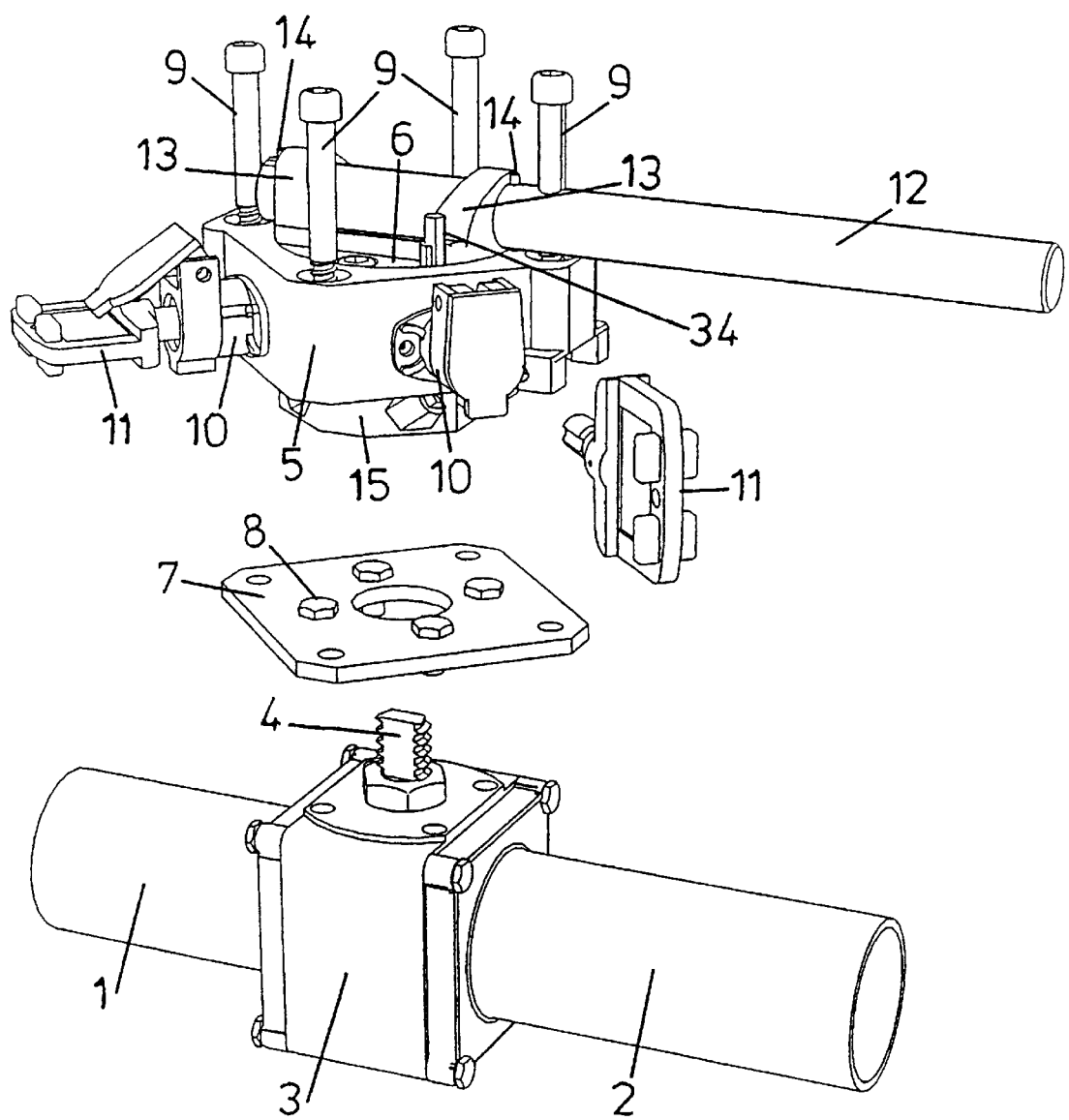
FIG. 1 is an exploded iv of a first embodiment of the present invention.
Figure 2:
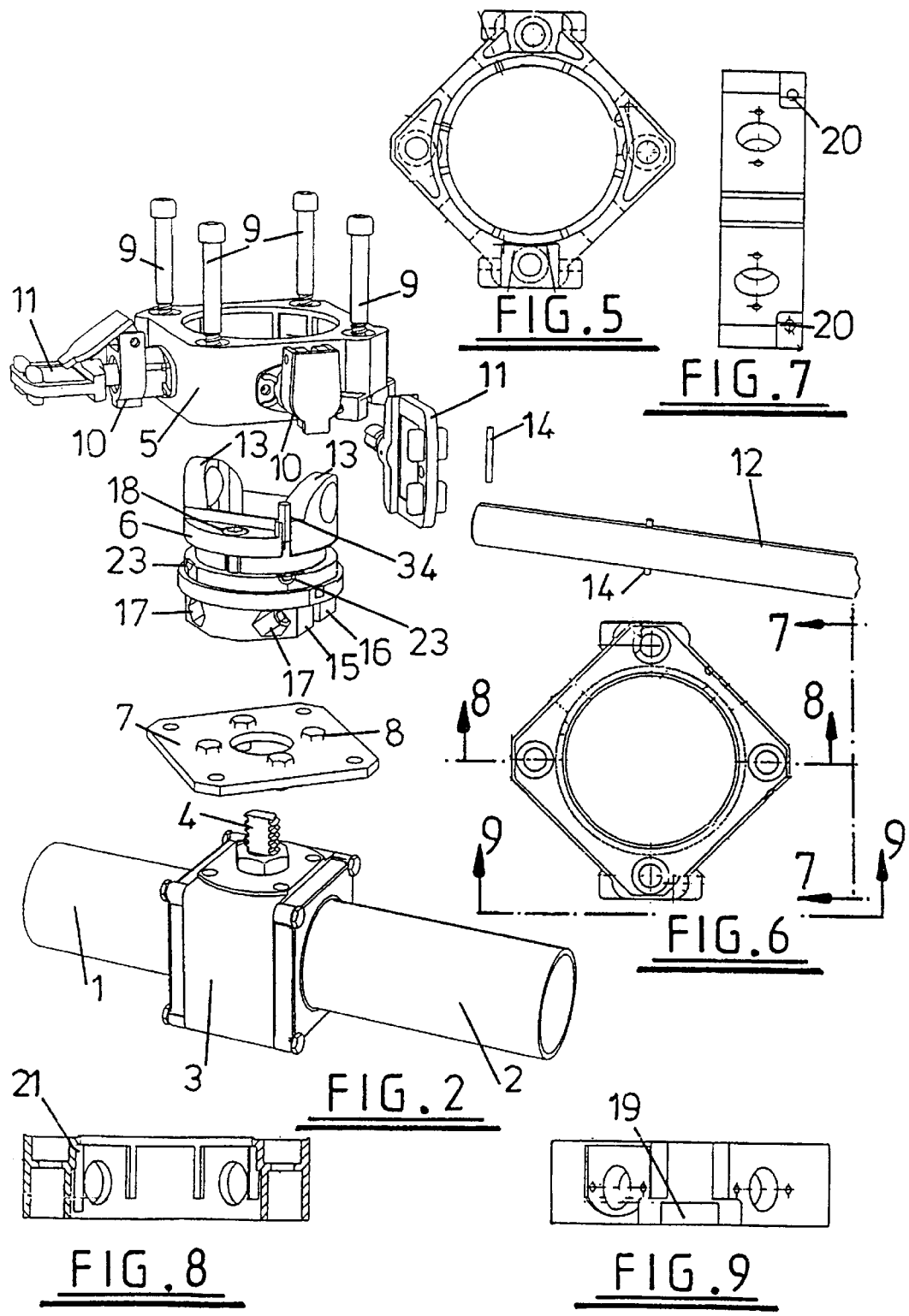
FIG. 2 is a view similar to that of FIG. 1 in which components have been further separated.
Figure 10:
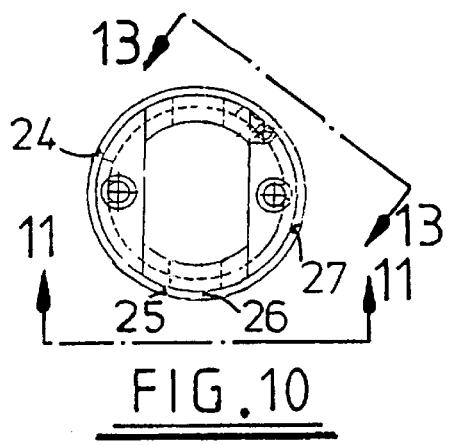
Figure 11:
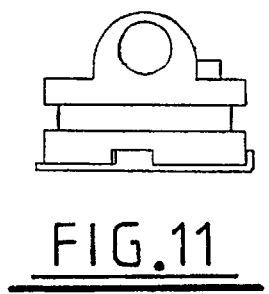
Figure 12:
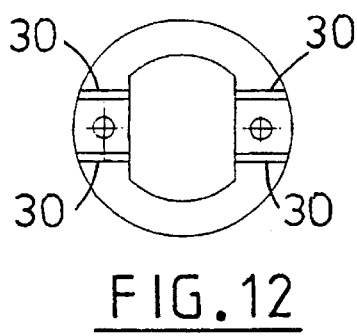

FIG. 10 a plan view of a hub incorporated in the embodiment of FIGS. 1 and 2;

FIG. 11 is a view on the line 11—11 of FIG. 10,

FIG. 12 is a view from below of the hub of FIG. 10, and

Figure 13:
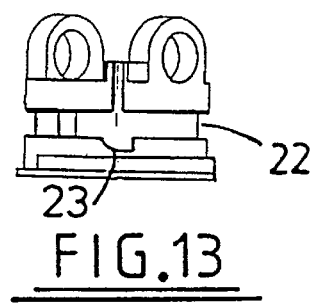
Figure 14:
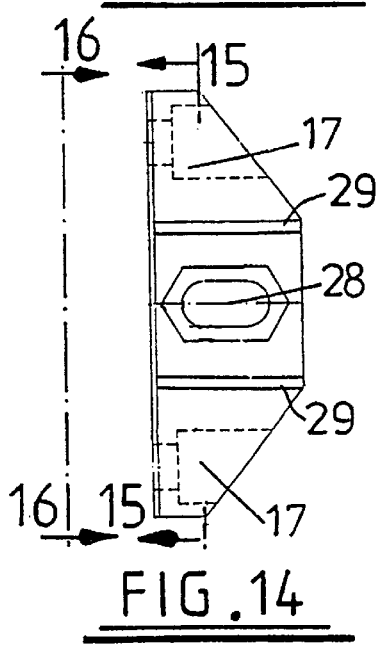
Figure 15:
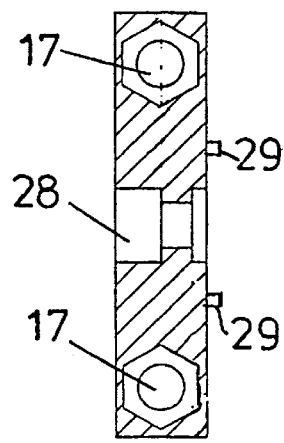

FIG. 13 is a view on the lines 13—13 of FIG. 10;

FIG. 14 is a plan view of a clamping, jaw incorporated in the embodiment of FIGS. 1 and 2;

FIG. 15 is a section on the line 15—15 of FIG. 14, and

Figure 16:
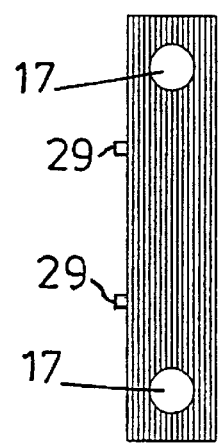
Figure 17:
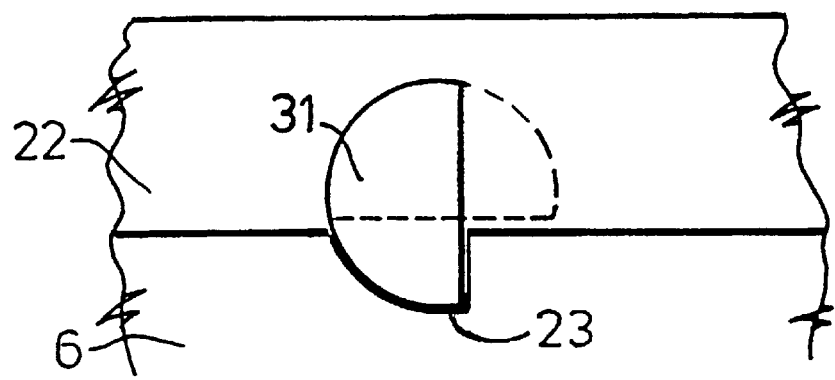
Figure 18:
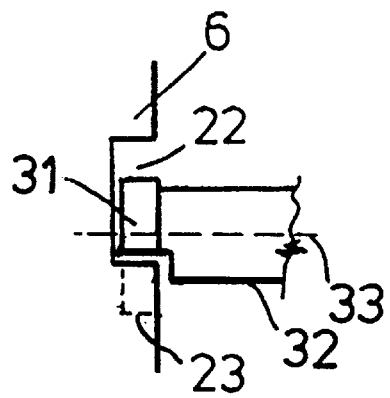
Figure 19:
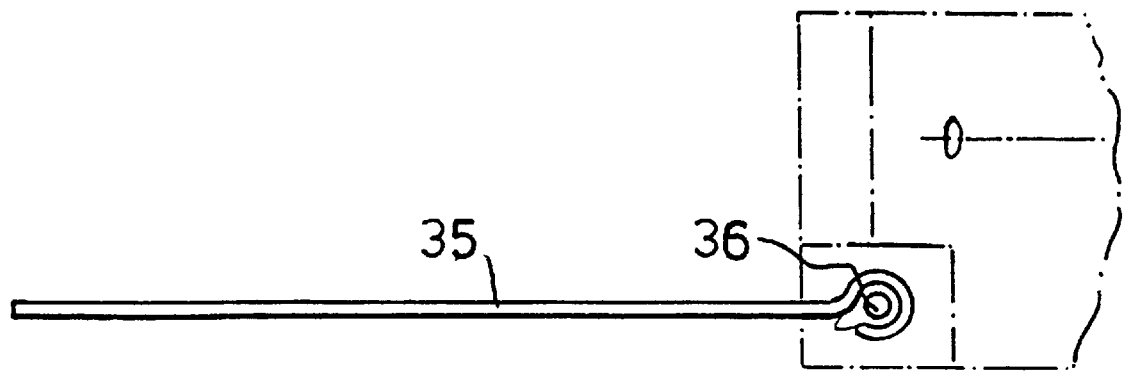
Figure 20:
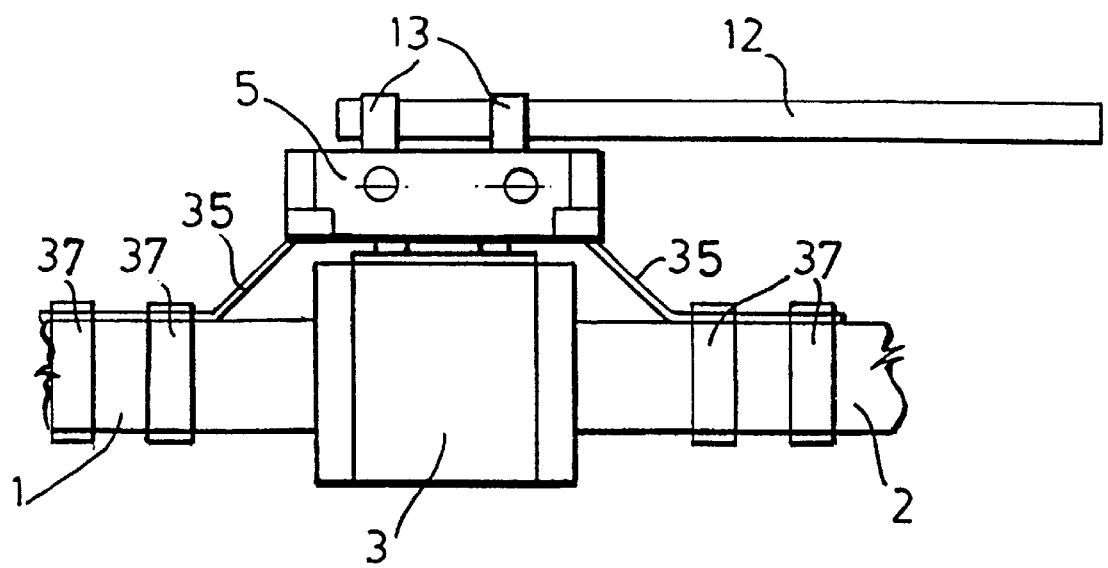

FIG. 16 is a view on the line 16—16 of FIG. 14;

FIG. 17 illustrates a detail of the structure of the hub of FIGS. 10 to 13 and the manner in which it interacts with the locking latch;

FIG. 18 is a schematic view from one side of the structure illustrated in FIG. 17;

FIG. 19 is a schematic illustration of an alternative fixing device to that shown in FIGS. 1 and 2 which may be used to clamp an actuator mechanism to a valve body;

FIG. 20 is a schematic illustration of an actuator assembly secured to a valve body by the straps of the type illustrated in FIG. 20.

FIGS. 21 to 25 illustrate an alternative clamping jaw to that illustrated in FIGS. 14 to 16, FIG. 21 being a section on the lines 21—21 of FIG. 24, FIG. 22 being a view on lines 22—22 of FIG. 24. FIG. 23 being view on lines 23 of FIG. 24 and FIG. 25 being a view similar to that of FIG. 24 but showing the jaw in contact with a different spindle cross-section;

FIGS. 26, 27, and 28 show components of a clamping mechanism for use in an arrangement similar to that shown in FIG. 20; and FIG. 29 shows components as illustrated in FIGS. 26 to 28 incorporated in a clamping arrangement.

Referring to FIGS. 1 to 4, the illustrated arrangement is intended to provide a retro-fitted lockable valve actuator mechanism on an existing valve assembly. The existing valve interconnects pipes 1 and 2 and comprises a valve body 3 from which a spindle 4 projects. The projecting portion of the spindle 4 defines parallel flat surfaces against which in use corresponding surfaces of a hand wheel or actuating lever (not shown) will normally engage. The original hand wheel or lever has been removed to enable the fitting of the illustrated lockable mechanism.

The illustrated mechanism comprises an actuator body 5, a hub 6 which is retained within the actuator body, and a mounting plate 7. The mounting plate is secured by bolts 8 to threaded bores in the valve body 3. It will be appreciated that most valve bodies are provided with threaded bores to enable various components to be fitted thereon. A relatively limited number of mounting plates could be provided to fit a wide range of different existing valves. After the mounting plate 7 has been secured to the valve body 3, the actuator body 5 is secured to the mounting plate by bolts 9. The actuator body supports lock mechanisms 10 which are actuable by keys 11. The lock mechanisms will not be described in great detail as they are essentially conventional. A bar 12 is inserted through loops 13 which arc an integral part of the hub 6 and secured in position by pins 14 to enable torque to be applied to the hub 6.

The hub 6 carries a pair of jaws 15, 16 which project downwards from the actuator body 5 on opposite sides of the spindle 4. Bores 17 are defined in each of the jaws 15, 16 and receive bolts which extend perpendicular to and on either side of the rotation axis of the spindle 4. The jaws 15 and 16 are retained by bolts 18 extending on opposite sides of and parallel to the rotation axis. Thus when the bolts 18 are loose, the jaws 15 and 16 can be moved towards and away from each other. In use, the bolts within bores 17 are tightened to clamp the jaws in contact with the flat surfaces defined by the spindle 4, and thereafter the bolts 18 are tightened to clamp the jaws 15 and 16 against the body of the hub 6. An extremely rigid structure results which is capable of transmitting a large torque from the bar 12 through the hub 6 to the valve spindle 4.

Details of the structure of the actuator body 5 are illustrated in FIGS. 5 to 9. It will be noted that at each side of the actuator body a recess 19 is formed which is intersected by bores 20 to enable pivot pins to be inserted in the bores 20 which project across the recesses 19. As described below this enables a strap to be pivotally secured to the actuator body. In addition it will be noted that the actuator body supports a series of axially extending strengthening ribs including a rib 21 which extends closer to the lower surface of the actuator body than the other ribs. The rib 21 engages with formations defined by the hub 6 so as to limit the maximum relative rotation between the hub 6 and the actuator body 5.

FIGS. 10 to 13 illustrate the detailed structure of the hub 6. A slot 22 receives a locking member latch which, as described below, at selected angular positions of the hub relative to the actuator body 5 may be displaced into engagement with recesses 23 (FIG. 2) defined in side walls of the slot 22. In addition, the lower surface of the hub defines projecting surfaces 24, 25, 26 and 27. If the assembly is to have a maximum rotation of 90°, the projecting body defining the surfaces 25 and 26 is retained and the rib 21 is positioned between the surfaces 24 and 25. If the assembly is to have a maximum rotation of 180°, the body of material extending between and defining the surfaces 25 and 26 is removed, in which case the rib 21 is retained between the surfaces 24 and 27. Thus a single high quality casting can be used for the hub in the case of both 90° and 180° turn valves, the only modification required to accommodate 180° valves being the machining out of the body of material extending between the edges 25 and 26.

FIGS. 14, 15 and 16 illustrate the detailed structure of the jaws 15, 16 of FIGS. 1 to 4. The two jaws are identical and only one is shown in the drawings. Each jaw defines a bore 28 which in use receives one of the bolts 18 shown in FIG. 2. The jaw surface facing the spindle is grooved, for example with 1 mm deep peaks spaced 2 mm apart, to improve grip on the valve spindle.

Ribs 29 are defined on the side of the jaws 15, 16 facing the hub 6 and engage in grooves 30, (FIG. 12) defined in the hub to ensure the alignment of the two jaws.

FIGS. 17 and 18 schematically illustrate the locking mechanism which enables the hub 6 to be locked against rotation relative to the actuator body 5. The hub 6 defines the slot 22 in one side edge of which the recess 23 is formed. The locking mechanism supports a spring loaded locking member 31 which when in the locked position shown in full line in FIG. 17 can engage in the recess 23. The latch 31 can be rotated through 90° to the position shown in broken lines in FIG. 17 so as to clear the recess 23 and to enable rotation of the hub relative to the actuator body and the latch 31 which is carried by the actuator body.

FIG. 18 is a side view of the arrangement of FIG. 17 after rotation of the latch 31 to the lock released position. The latch 31 is carried on a shaft 32 which is rotatable about axis 33 as a result of rotation of the key in the associated locking mechanism. She shaft 32 is biased to the left in FIG. 18 and hence in normal conditions the latch 31 is received within the slot 22 and therefore can be rotated to engage in the recess 23. The latch member 31 can be biased to the right in FIG. 18 however, and if so displaced can assume a position in which it is clear of the slot 22 and therefore, regardless of its angular position, cannot engage in the recess 23 to lock the hub 6 against rotation relative to the actuator body.

Referring again to FIGS. 1 and 2, it will be seen that 3 pin 34 is carried by the hub 6 and projects from the upper surface of the hub 6 adjacent one of the loops 13. The pin 34 is retained by clips (not shown) in a bore defined by the hub 6. It will also be noted that the pin 34 is aligned with one of the recesses 23. In normal operation, the pin 34 is in the position shown in FIG. 2. If the locking mechanism is to be released in an emergency, the pin 34 is driven into the hub. The pin 34 is positioned so that, when it is driven in it is forced between the latch 31 and the bottom of the slot 22, thereby forcing the latch 31 in the direction which is to the right in FIG. 18 and pushing the latch 31 out of the slot 22. Thereafter the valve may be operated regardless of the fact that the latch 31 is in the nominally locked position. Such an override facility can be important in some circumstances where in an emergency it is vital to close a valve without following the normal interlock procedure. The pin is retained in the hub and as a result emergency release of the mechanism is apparent on subsequent inspection.

In the arrangement illustrated with reference to FIGS. 1 to 18, the actuator body is secured to the valve body through the intermediary of the mounting plate 7. In some circumstances however it may be difficult to provide a mounting plate which can be readily secured both to the valve body and to the actuator body. FIGS. 19 and 20 illustrate a device for securing the actuator body to the valve body in such circumstances.

Referring to FIGS. 19 and 20, straps 35 are provided which are fabricated from for example sheet steel, and the ends of which are bent over to receive pins 36. The pins 36 can be received in the bores 20 (FIG. 7) so that the straps 35 can be pivotally secured in the recesses 19 defined by the actuator body. The actuator body can then be position appropriately over the valve body and the straps 35 can be pivoted downwards and deformed as necessary to enable them to be secured by hoop clamps 37 against the pipes 1 and 2. Thus a very simple yet robust arrangement is provided for securing the actuator body 5 to the valve body 3.

The illustrated arrangements may be used in association with auxiliary components to, for example, provide an output indicative of the position adopted by the valve spindle. For example one of the locking mechanisms could be removed and replaced by a magnetic or alternative remote sensing device sensitive to an element carried by the hub. A remote indication could thereby be given of the condition of a particular valve.

Figure 3:
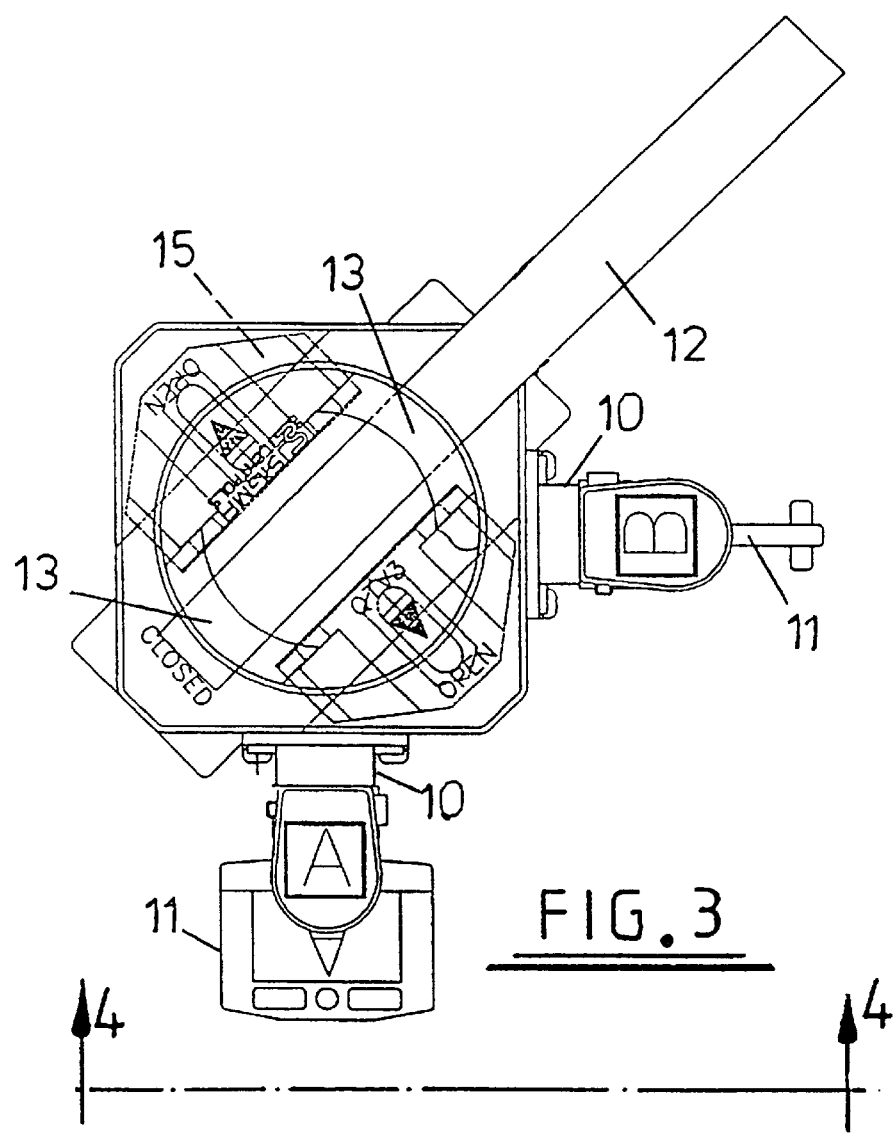
FIG. 3 is a view from above of the fully assembled mechanism shown in FIGS. 1 and 2.
Figure 4:
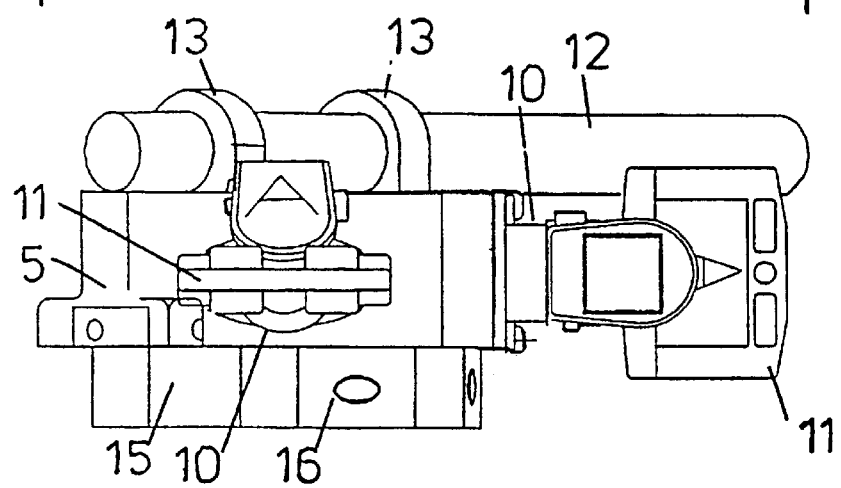
FIG. 4 is a view on the line 4—4 of FIG. 3.

As shown in FIGS. 1 and 2, the actuator body is secured in position by four bolts 9 and when so secured in position the actuator prevents access to the bolts 8. In order to prevent unauthorized tampering with the device, an annular plate may be glued onto the upper surface of the actuator body so as to cover the bolts 9. FIG. 3 shows such a plate in position carrying the labels "open" and "closed". A similar label is secured on the hub 6 to define arrows pointing to either the open or closed indication.

Referring to FIGS. 21 to 25, two identical jaws of the type illustrated are in use clamped on opposite sides of a spindle to which torque is to be delivered. Each of the clamping jaws defines surfaces 38, 39, 40 and 41 such that when two of the illustrated jaws are clamped around the spindle the spindle and clamping jaws together define a generally hexagonal structure. Each of the clamping jaws defines bores 42 which in use receive clamping bolts (not shown) which can be tightened to clamp the jaws against the spindle.

In contrast to the clamping jaws of FIGS. 14 to 16, the side of the clamping jaw which in use faces the spindle defines a recess 43 which is shaped so that it can snugly engage either an eight-sided spindle as represented by the dotted line 44 in FIG. 24 or a six-sided spindle as represented by the dotted line 45 in FIG. 25. This improves the interengagement between the clamping jaws and spindles of six- or eight-sided sections.

In further contrast to the clamping jaws of FIGS. 14 to 16, no means are provided for clamping the jaws to the rotatable hub. In the case of embodiments incorporating the clamping jaws of FIGS. 21 to 25, interengagement between the clamping jaws and the rotatable hub is achieved by engaging the clamping jaws in a six-sided socket defined by the hub, the spacing between the opposite faces of the six-sided socket being separated by a distance corresponding to the distance between the surfaces 38 and 41 of the clamping jaws. Thus torque applied to the hub is transmitted to the clamping jaws by interengagement between the hub socket and at least the surfaces 38 and 41 and from the clamping jaws to the spindle as a result of interengagement between the spindle and the recess 43. With such an arrangement it will be appreciated that the hub as illustrated in FIG. 2 is modified to define a recess capable of receiving and engaging with the clamping jaws.

Referring to FIGS. 26 to 29, an alternative arrangement to that illustrated in FIG. 20 will be described. In the arrangement of FIG. 20, straps 35 are shaped on site to lie against pipes 1 and 2 and then clamped in engagement with those pipes by hoop clamps 37. The arrangement of FIG. 26 to 29 enable straps to be clamped to a supporting pipe without it being necessary for the straps to be deformed.

Referring to FIGS. 26 to 29, a strap 46 extends from an assembly such as that illustrated in FIG. 20 and is clamped to a pipe 47 similar to the pipe 2 of FIG. 20. A hoop clamp 48 is engaged between a U-section clamp 49 (FIGS. 26 and 27) and a plate 50 (FIG. 28) from which a pair of bolts 51 extend. Nuts 52 may be tightened against the clamp 49 so as to pull the plate 50 into the U-shaped recess defined by the clamp 49. Nuts 53 may be positioned on the bolts 51 in alignment with the strap 46, the strap being apertured so that that the bolts 51 extend therethrough, and nuts 54 may then be tightened down so as to securely clamp the strap 46 against the nuts 53.

In operation, a hoop clamp 48 is first wrapped around the pipe 47 so as to extend over the plate 50 between the bolts 51. The clamp 49 is then slipped onto the bolts 51 and nuts 52 are tightened down, thereby securely attaching the clamp structure to the hoop clamp 48 and at the same time further tensioning the hoop clamp. Nuts 53 are then screwed onto the bolts 51, the strap 46 is fitted over the bolts 51, and the nuts 54 are tightened down. The strap 46 is thus securely clamped to the pipe 47.

What is claimed is:

1. An actuator for controlling the rotation of a valve spindle relative to a valve body, the actuator comprising an actuator body which in use is secured to the valve body, a hub retained by the actuator body so as to be rotatable relative to the actuator body about the rotation axis of the spindle, jaws movably mounted on the hub and displaceable into engagement with the spindle, and means for clamping the jaws in engagement with the spindle such that torque applied to the hub is transmitted to the spindle.

2. An actuator according to claim 1, wherein the jaws are slidably mounted on the hub and interconnected by a pair of bolts extending perpendicular to and on opposite sides of the rotation axis, whereby the jaws may be clamped onto the spindle by tightening the bolts.

3. An actuator according to claim 2, wherein the jaws are retained on the hub by further bolts extending parallel to the rotation axis, whereby tightening of the further bolts clamps the jaws to the hub.

4. An actuator according to claim 1, wherein an actuating bar is secured to portions of the hub projecting from the actuator body.

5. An actuator according to claim 1, wherein a lock mechanism is engageable between the actuator body and hub to prevent rotation of the hub relative to the actuator body.

6. An actuator according to claim 5, wherein the lock mechanism is carried by the actuator body and supports a displaceable latch which projects into a slot formed in the hub, at least one recess being defined in a side wall of the slot, and the latch being displaceable into the recess when the hub is in a predetermined position relative to the actuator body to lock the hub in position.

7. An actuator according to claim 6, wherein the latch is biased radially inwards into the slot and is displaceable in the radially outwards direction to a position in which it is radially outside the slot, emergency release means being supported on the hub and displaceable into the recess to displace the latch into the said position.

8. An actuator according to claim 1, wherein in use the actuator body is secured to a mounting plate which is secured to the valve body.

9. An actuator according to claim 8, wherein the mounting plate is bolted to the valve body, the actuator body is bolted to the mounting plate and obstructs access to the bolt securing the mounting plate to the valve body, and a cover plate is secured to the actuator body so as to obstruct access to the bolt securing the actuator body to the mounting plate, the cover plate being secured in a manner which prevents its removal without damage.

10. An actuator according to claim 1, wherein in use the actuator body is secured to the valve body by straps which extend from the actuator body and are clamped to pipework connected to the valve body.

11. An actuator according to claim 1, wherein the jaws are slidably received in a socket defined by the hub and interconnected by a pair of bolts extending perpendicular to and on opposite sides of the rotation axis, whereby the jaws may be clamped onto the spindle by tightening the bolts, the jaws being shaped such that when clamped onto the spindle and engaged by the hub socket torque applied to the hub is transmitted to the spindle.

12. An actuator for controlling the rotation of a valve spindle relative to a valve body, the actuator comprising an actuator body which in use is secured to the valve body, and a hub mechanically coupled to the spindle via jaws movably mounted on the hub and displaceable into engagement with the spindle such that torque applied to the hub is transmitted to the spindle, wherein straps are mounted on the actuator body in orientations such that these straps may be clamped onto pipework connected to the valve body to secure the actuator body to the valve body.

13. An actuator according to claim 12, comprising clamps for connecting straps to the pipework, the clamps comprising a plate which may be clamped to the pipework by a hoop clamp, bolts supported by the plate, and means for securing the straps to the bolts.

14. An actuator according to claim 13, wherein a U-section clamp may be engaged over the plate and clamped against the plate such that the hoop clamp is trapped between the plate and clamp.

15. An actuator according to claim 10 or 11, wherein the straps are formed from plates of deformable material and are pivotally mounted on the actuator body.

16. An actuator for controlling the rotation of a valve spindle relative to a valve body substantially as hereinbefore described with reference to the accompanying drawings.

* * * * *